Oct. 12, 1965

M. M. LILLY ETAL 3,211,179

TIME CYCLE CONTROLLER

Filed June 26, 1963

Mason M. Lilly
Erskine E. Roach
INVENTORS

BY

ATTORNEY

Mason M. Lilly
Erskine E. Roach
INVENTORS

Mason M. Lilly
Erskine E. Roach
INVENTORS

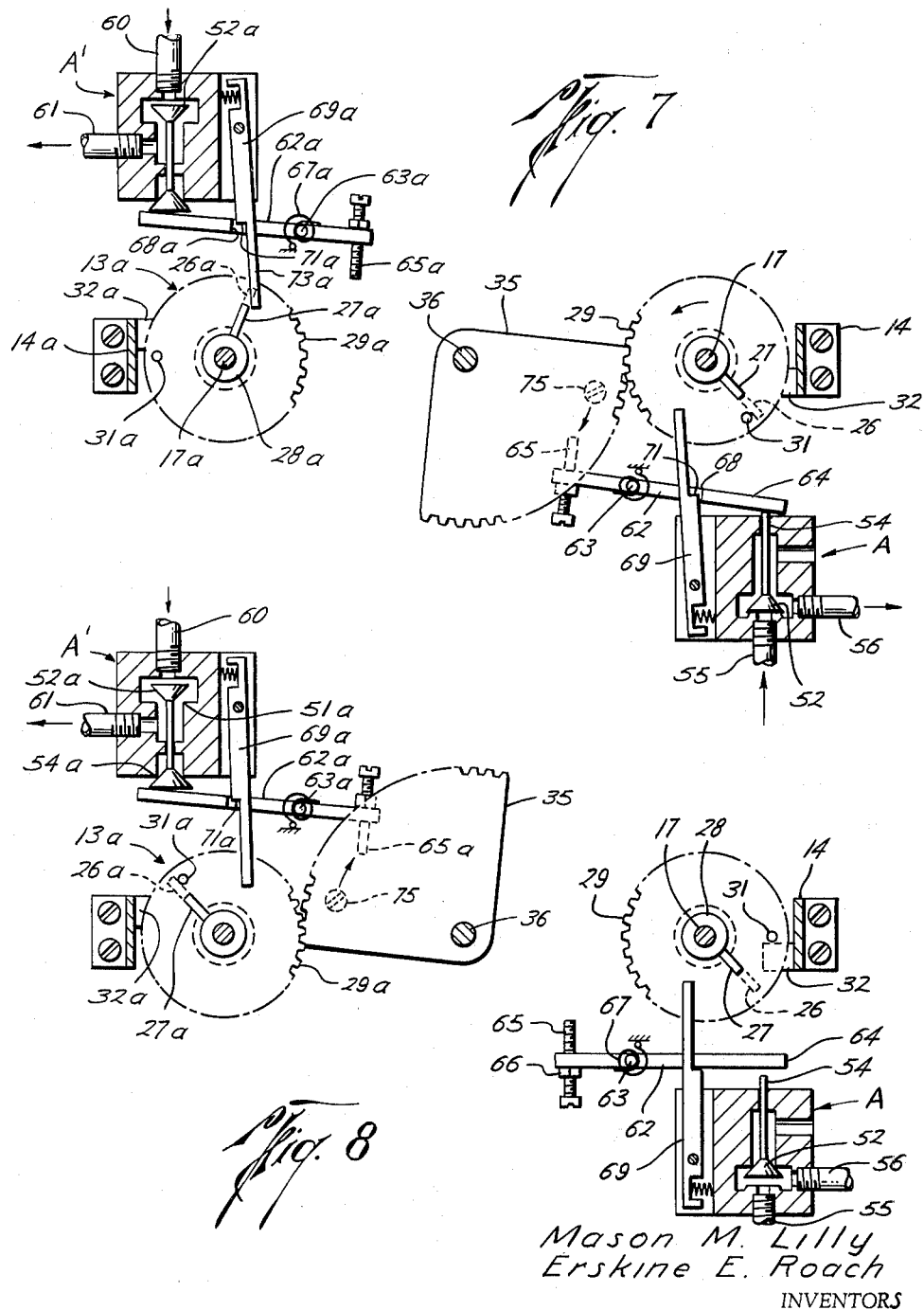

United States Patent Office 3,211,179
Patented Oct. 12, 1965

3,211,179
TIME CYCLE CONTROLLER
Mason M. Lilly and Erskine E. Roach, Houston, Tex.,
assignors to Harold Brown Company, a corporation of
Texas
Filed June 26, 1963, Ser. No. 290,849
10 Claims. (Cl. 137—624.14)

This invention relates to time cycle controllers and more particularly to the form of controllers more commonly referred to as a repeat cycle timer or intermitter.

A repeat cycle timer is one in which an operation is conducted for a pre-determined time period and is repeated at pre-determined time intervals. While there are many applications for such timers, one important application is in gas lift operations for producing oil wells in which gas under high pressure is injected into a well at pre-determined intervals to lift the oil to the surface. The injection of gas will generally be continued for comparatively short periods of time while the cycles may be repeated at various intervals, depending primarily upon the characteristics of the well.

Accordingly, for purposes of description and illustration of the present invention, it will be described as applied to a gas injection operation for gas-lifting oil, although, as will be evident, the invention has much broader application.

Current cycle timers used in producing oil wells utilize clock-driven timing wheels and hydraulic or gas escapement devices for timing the gas injection or "open" time and the cycle periods. The clock-driven device requires a timing wheel having numerous movable pegs for adjusting the cycle periods and operating time and is programmed to open and close a pilot valve which actuates a main control valve in the gas supply line to the well. In order to make even a slight change in either cycle frequency or operation time, it is necessary to re-program the whole timing wheel. This requires a change in each time function set on the wheel, which is both time-consuming and tends to cause operating personnel to postpone changes in the timer until long after they are needed, thereby often rendering the lifting operation inefficient and resulting in gas wastage.

The gas and hydraulic escapement timers which are currently in use, modify the time intervals programmed by adjustment of a gas or liquid passage which allows more or less fluid to pass per unit of time, thereby setting the time for each excursion of a controlled device. While such timers do not have the disadvantages of the timing wheel, they do have other disadvantages which are quite significant. In particular, they lack accuracy because of the change in volume of the operating fluids due to ambient environment temperatures, which will necessarily vary the time setting proportionately. Moreover, the adjustments required are very delicate and difficult to make and maintain.

It is, therefore, a primary object of the present invention to provide an improved time cycle controller which obviates the several disadvantages of more conventional devices, such as those described above.

Other important objects are the provision of a controller which is exceptionally accurate; in which the time program may be changed very easily; in which the timing elements are variable through any desired increments within the functional limits of the timing mechanisms; and which is simple in design and construction.

Generally stated, a controller in accordance with this invention, includes at least two interval timers of the generally conventional spring wound mechanical escapement type, one of which determines the cycle interval, and the other determines the operation interval occurring within the cycle. Such timers have a reversible output shaft which rotates under the force of the wound spring between a fixed or indexing stop and a variable stop which can be set to any angular relationship up to 360° from the fixed stop. The speed of rotation is determined by the gear train with the escapement and the time interval is determined by the pre-set angular relationship between the stops. Each of the timers cooperates with an operation device, the functioning of which is to be controlled and with a restoring or re-winding mechanism for automatically re-winding and re-setting the timers at the end of each cycle.

The operation devices may be of various types such as pilot valves controlling pneumatic or hydraulic fluids, electrical switch contacts, and the like, which may, in turn, control other mechanisms which are ultimately to be regulated by the timer cycle controller.

In the illustrative embodiment, the restoring mechanism is powered by a pneumatic fluid pressure-driven turbine, and the operation devices are pilot valves, one of which controls pressure fluid supplied to a mechanism to be controlled, such as a diaphragm motor valve, and the other of which controls the pressure fluid supplied to the turbine during operation of the restoring mechanism.

In operation, when the cycle timer attains the end of its time interval, means on this timer shaft actuates the related pilot valve to open the pressure fluid supply to the turbine driving the restoring mechanism which, in the illustrative embodiment, is a sector gear. The latter then sequentially drivingly engages the shafts of the operation and cycle timers rotating them back to their respective starting positions. The restoring mechanism also resets the pilot valves at appropriate stages in its operation, opening the operations pilot valve at the completion of the re-winding of the operation timer and closing the turbine-control pilot valve upon completion of the re-winding of the cycle timer.

Other and more specific objects and advantages of this invention will become more readily apparent from the following detailed description when read in conjunction with the accompanying drawing which illustrates a useful embodiment in accordance with this invention.

In the drawing:

FIGS. 6, 7 and 8 are views generally similar to FIG. 3, showing certain of the parts of the device at different stages in the operation thereof.

Figure 1:
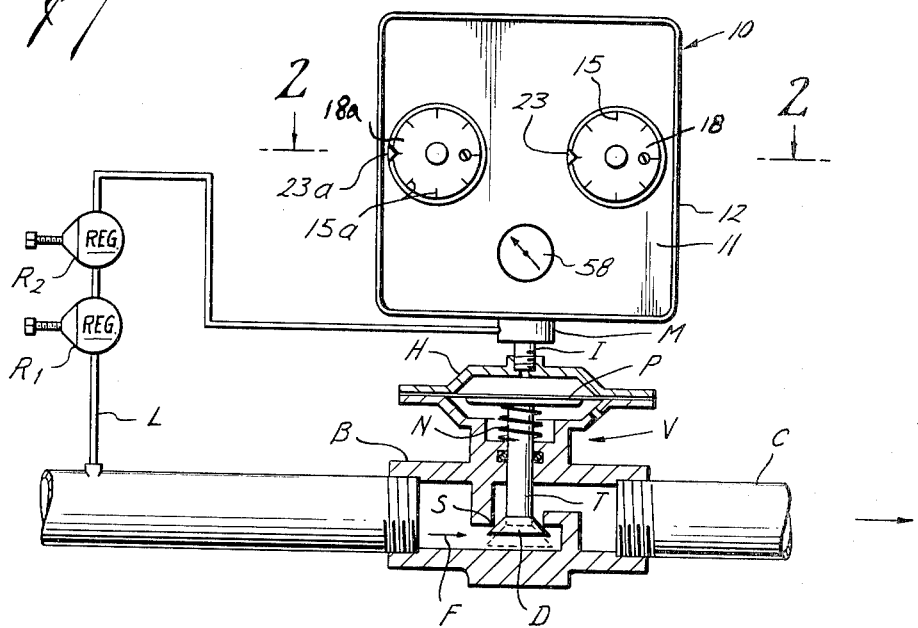
FIG. 1 is a diagrammatic view, partly in section, illustrating the controller connected to a control valve in a fluid conduit.

Referring to the drawing:

FIG. 1 shows a controller, designated generally by the numeral 10, arranged for controlling a conventional diaphragm motor-operated control valve, designated generally by the letter V, mounted in a conduit C, such as a high pressure gas line employed for supplying lifting gas to the gas lift system of an oil well (not shown). In the illustrative embodiment, valve V comprises the body B having a flowway F therethrough provided with a seat S controlled by a valve disk D mounted on a stem T, which is connected to a flexible diaphragm P mounted in a diaphragm chamber H. Valve V is illustrated as a normally closed valve, being biased to the closed position by a coil spring N acting against the lower side of diaphragm P. Valve V is moved to the open position by fluid pressure introduced into diaphragm chamber H above the diaphragm P through an inlet I, which is connected to a manifold block M. The latter is connected to elements of the controller 10 in a manner to be subsequently described. As indicated, valve V is entirely conventional and the details thereof do not form a part of the present invention, but is illustrated as an example of a device whose operation may be readily controlled by means of the controller in accordance with the present invention. Pneumatic operating fluid for operation of the controller, may be supplied to the latter from conduit C through a line L, which is connected to conduit C upstream of valve V and leads to manifold block M. One or more conventional step-down pressure regulators $R_1$ and $R_2$ may be installed in conduit L to reduce the pressure of the gas to any desired pressure, as may be required for operation of the controller. It will be understood that the supply of pneumatic operating fluid may come from external sources other than conduit C, and may be any suitable pneumatic fluid, such as bottled liquefied petroleum gas, air, nitrogen, or the like, it not being essential that the operating gas for the controller be supplied from the system which is being controlled.

Figure 2:
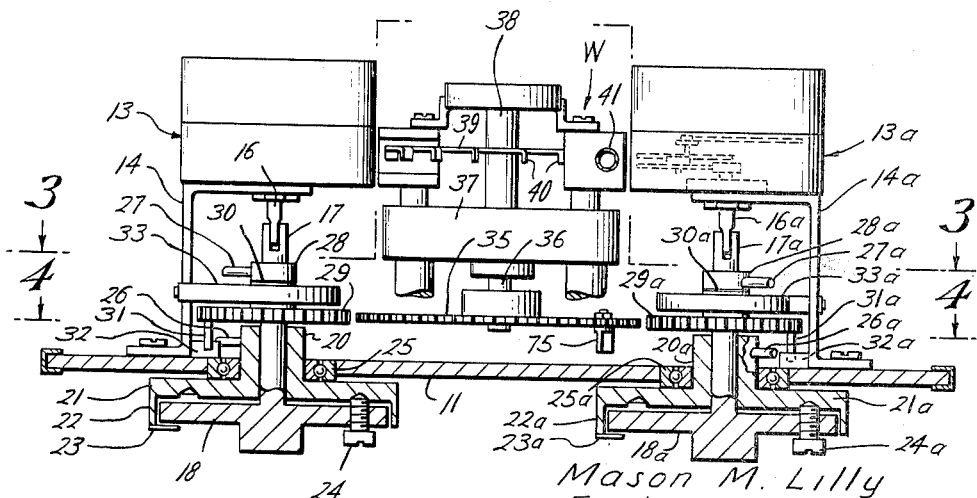
FIG. 2 is a cross sectional view of the controller taken generally along line 2—2 of FIG. 1.
Figure 3:
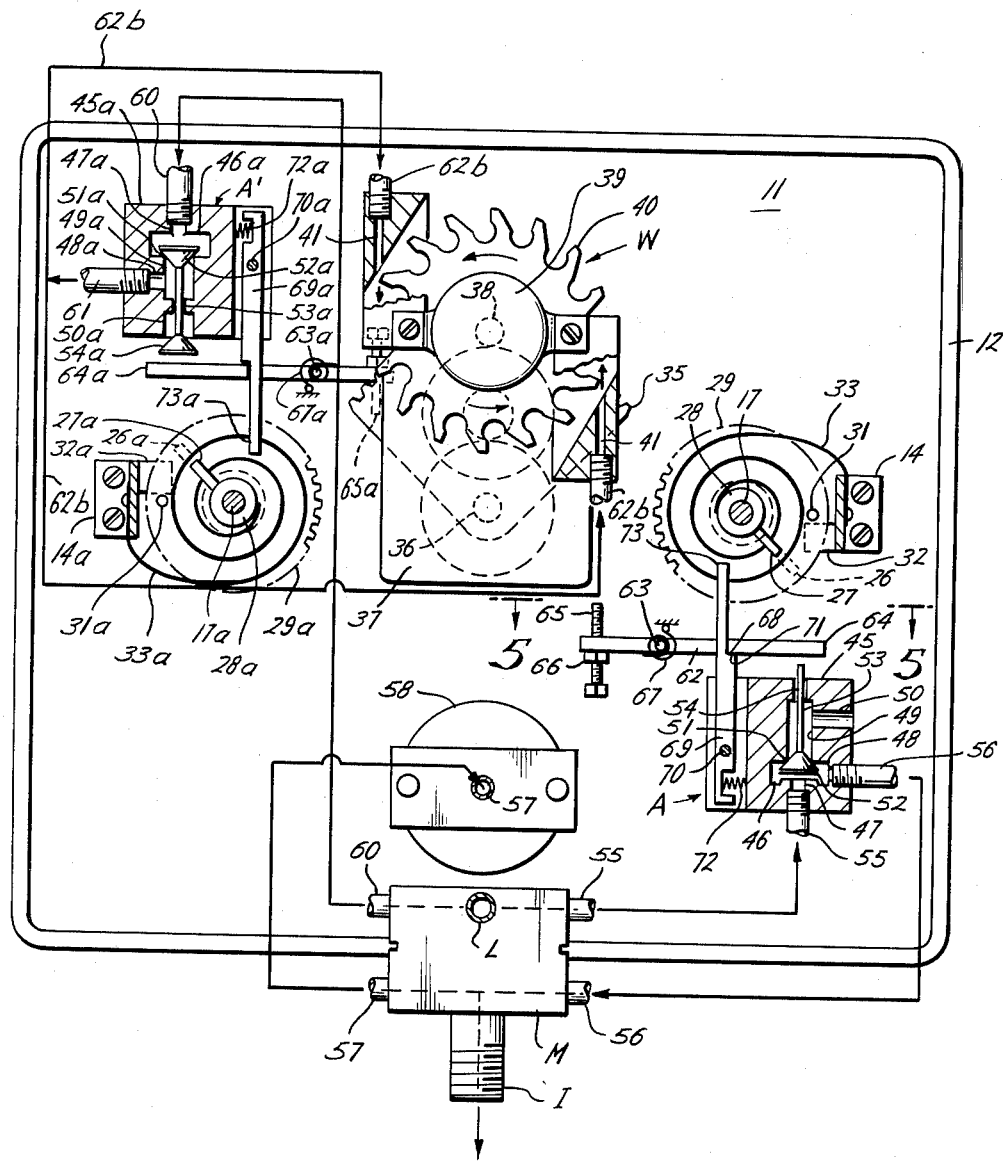
FIG. 3 is a view taken generally along line 3—3 of FIG. 2, some of the parts being shown in section and others in plan or elevation.

Referring now to FIGS. 2 and 3, in particular, controller 10 is mounted on a panel 11 suitably supported in a housing 12. A pair of timers, designated generally by the numerals 13 and 13a, are suitably supported on the rearward side of the panel on brackets 14 and 14a in laterally spaced relation. Timers 13 and 13a, as indicated, are of the conventional mechanical escapement type employing wound springs as sources of power which deliver the power generated by unwinding the spring through suitable gear trains to escapement shafts 16 and 16a, respectively. As such timers are well known, the details thereof form no part of the present invention, but the general arrangement of the mechanical escapement is shown in broken lines in FIG. 2 for timer 13a. For purposes of this disclosure, timer 13 will be referred to as the "operation" or "open" timer and timer 13a as the "cycle" timer. As the timers and their directly associated elements are identical, the same parts of each will be designated by the same numerals, except that those applied to the parts connected with cycle timer 13a will add the letter a to the respective numerals.

Escapement shafts 16 and 16a are coupled to extension shafts 17 and 17a and project through suitable openings in panel 11. The forward or projecting ends of shafts 17 and 17a terminate in respective annular flanges 18 and 18a, having suitable time interval indicia 15 and 15a marked on the outer faces thereof adjacent their rims. Sleeves 20 and 20a surround the portions of shafts 17 and 17a which extend through the panel openings and terminate in annular flanges 21 and 21a which are disposed immediately behind shaft flanges 18 and 18a and parallel thereto. Sleeve flanges 21 and 21a have outwardly extending rims 22 and 22a surrounding the peripheries of the shaft flanges and carrying pointers 23 and 23a which project over the outer faces of shaft flanges 18 and 18a in indicating relation to the indicia on the latter. Set screws 24 and 24a extend through shaft flanges 18 and 18a into clamping engagement with sleeve flanges 21 and 21a for locking the related flanges together. Sleeves 20 and 20a are mounted in anti-friction bearings 25 and 25a disposed in the openings in panel 11 through which the sleeves extend.

A radially projecting pin 26 is mounted in sleeve 20 at a point just inside panel 11 and a second radially projecting pin 27 is mounted in a collar 28 fixedly secured to shaft extension 17 at a point longitudinally spaced from pin 26. An identical set of pins 26a, 27a and collar 28a are provided for extension shaft 17a of timer 13a. It will be seen that the angular relationship between pins 26 and 27 and between pins 26a and 27a may be varied as desired by rotating sleeves 21 and 21a relative to shaft extensions 17 and 17a, and the pins may be locked in the desired angular relation by locking the so-adjusted sleeve and shaft flanges together by means of set screws 24 and 24a. The angular relation thus set will determine the operating time interval for each of the timers, which will be indicated by the positions of pointers 23 and 23a relative to indicia 15 and 15a.

Rewind gears 29 and 29a, having hubs 30 and 30a, are mounted on extension shafts 17 and 17a between collars 28 and 28a and the ends of respective sleeves 20 and 20a. Gears 29 and 29a float on their respective shafts and carry forwardly projecting stop pins 31 and 31a near their rims arranged to engage pins 26 and 26a at certain stages in the relative movements of these parts, as will appear hereinafter. Stop lugs 32 and 32a are secured to brackets 14 and 14a to project into the paths of rotation of stop pins 31 and 31a to limit such rotation. Coil springs 33 and 33a have one end secured to the respective brackets 14 and 14a and the other end to the hubs 30 and 30a to continuously bias gears 29 and 29a rotatably in a direction to urge stop pins 31 and 31a toward the respective stop lugs 32 and 32a.

A restoring or re-wind mechanism, designated generally by the letter W, is mounted in housing 12 behind panel 11 in position for cooperation with both timers. Re-wind mechanism W includes a sector gear 35 (including an arc of about 90° in the illustrative embodiment) mounted for rotation by the output shaft 36 of a gear reducer 37 (FIGS. 2 and 3). The input shaft 38 of the gear reducer carries a turbine wheel 39 having vanes 40. A pair of angularly spaced apart nozzles 41—41 are mounted about the periphery of the turbine wheel in position to deliver jets of pressure fluid against vanes 40 in a direction to produce rotation of sector gear 35 in the clockwise direction, as viewed in FIG. 3. Turbine wheel 39 is illustrated by the arrow thereon as rotating in the counter-clockwise direction, but through appropriate gearing in the gear reducer, sector gear 35 will rotate in the clockwise direction, as indicated, its position being such as to successively engage re-wind gears 29 and 29a, as will appear subsequently.

In the illustrative embodiment, the operating devices associated with the timers are generally conventional pilot valves, designated respectively by the letters A and A′ (FIG. 3). The pilot valves, which are illustrated more or less diagrammatically, are of any suitable or generally conventional form commonly employed for controlling the flow of pneumatic pressure fluid which, in turn, is to be employed to actuate other operating devices. As illustrated, pilot valve A is of the normally closed type, while pilot valve A′ is of the normally open type, although with slight modifications, which will be obvious to those skilled in this art, both valves may be of the normally open type.

Pilot valve A includes a housing 45 having a valve chamber 46 in communication with an inlet port 47 and an outlet port 48. Valve chamber 46 has a lateral extension 49 provided with a vent port 50. A seat 51 is provided in extension 49 between chamber 46 and vent port 40, and a valve disk 52 is mounted on the inner end of a valve stem 53 and is arranged to open inlet 47 and close seat 51 by upward movement under pressure of fluid entering chamber 46 through inlet 47, thereby opening the valve to passage of pressure fluid therethrough. The free end 54 of stem 53 projects outwardly of body 45. Thus, it will be seen that when the outer end 54 of stem 53 is pushed downwardly, valve disk 52 will be moved downwardly to a position closing inlet port 47, thereby shutting-off fluid flow to outlet port 48.

Pilot valve A′ comprises a body 45a enclosing a valve chamber 46a communicating with an inlet port 47a and an outlet port 48a and with a lateral extension 49a. The outer end of extension 49a forms the vent port 50a opening to the exterior of the valve body. The juncture of extension 49a with valve chamber 46a defines a valve seat 51a. A valve disk 52a is positioned in valve chamber 46a to control seat 51a and is secured to the inner end of a valve stem 53a which projects through vent port 50a and carries on its outer end a valve disk 54a which is adapted to close-off vent port 50a when moved inwardly, while at the same time opening the passageway through seat 51a by moving valve disk 52a away from the seat. Pneumatic pressure fluid, such as natural gas, from conduit C is supplied to pilot valve A through inlet line 55 which communicates in manifold block M with supply line L. This pressure fluid will discharge through outlet port 48 and a conduit 56, which leads through manifold block M into communication with nipple I which leads to the diaphragm housing of control valve V. A branch 57 of conduit 56 leads to a pressure gage 58 mounted in panel 11 (see FIG. 1). Pneumatic fluid entering manifold block M through line L also flows through a conduit 60 which leads to inlet port 47a of pilot valve A'. From the latter, pressure fluid is discharged through a conduit 61 which directs the pressure fluid through branch conduits 62b–62b which lead to turbine jets 41–41.

Figure 5:
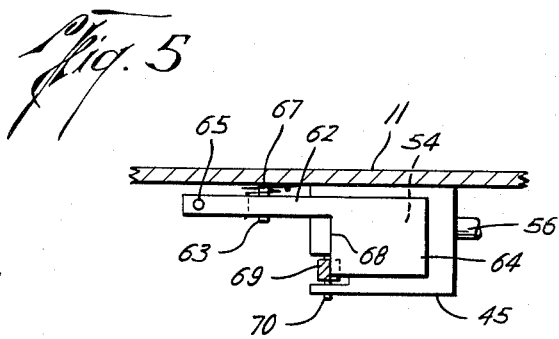
FIG. 5 is a view taken along line 5—5 of FIG. 3, showing some of the details of one of the elements of the device.

Identical actuating devices are provided for actuating the pilot valves by the respective timer mechanisms. These actuating devices comprise the levers 62 and 62a pivotally mounted on pivot pins 63 and 63a which are suitably supported on panel 11 to position the ends 64 and 64a of the arms in registration with the projecting ends 54 and 54a of the respective pilot valve stems 53 and 53a. The opposite ends of levers 62 and 62a carry adjustable cam followers 65 and 65a which are positioned to project into the path of rotation of sector gear 35, the cam followers being in the form of studs threaded through the ends of the levers and provided with lock nuts 66 and 66a for fixing them in their adjusted positions. Coil springs 67 and 67a are suitably secured about pivot pins 63 and 63a to normally bias ends 64 and 64a toward valve stem ends 54 and 54a, respectively. Levers 62 and 62a are notched at points intermediate pivot pins 63 and 63a and the respective ends 64 and 64a to define the shoulders 68 and 68a (see FIG. 5). Levers ends 64 and 64a are held out of contact with valve stem ends 54 and 54a by means of triggers 69 and 69a which are pivotally mounted in the respective pilot valve bodies 45 and 45a on pivots 70 and 70a. Triggers 69 and 69a have notches intermediate the respective pivot pins and the free ends thereof defining shoulders 71 and 71a adapted to interlock with shoulders 68 and 68a at one position of the triggers, this position being normally maintained by means of biasing springs 72 and 72a mounted in the valve bodies to urge the shoulders on the levers and the triggers into locking engagement, as best seen in FIG. 3. The free ends 73 and 73a of the triggers are arranged to project into the paths of rotation of the related timer pins 27 and 27a. With this arrangement it will be seen that when pins 27 and 27a are rotated in the appropriate direction to a sufficient extent to engage triggers 73 and 73a, they will swing the latter about pivots 70 and 70a against the resistance of the biasing springs sufficient to release the triggers from engagement with levers 62 and 62a, allowing the latter to swing into engagement with the projecting ends 54 and 54a of the pilot valve stems to thereby move the respective valve disks 52 and 52a to their inwardly displaced positions. Sector gear 35 carries a cam lug 75, which is positioned near one end of the sector gear in position to successively engage cam followers 65 and 65a in the course of its rotation during the re-winding operation, as will be described hereinafter.

Figure 4:
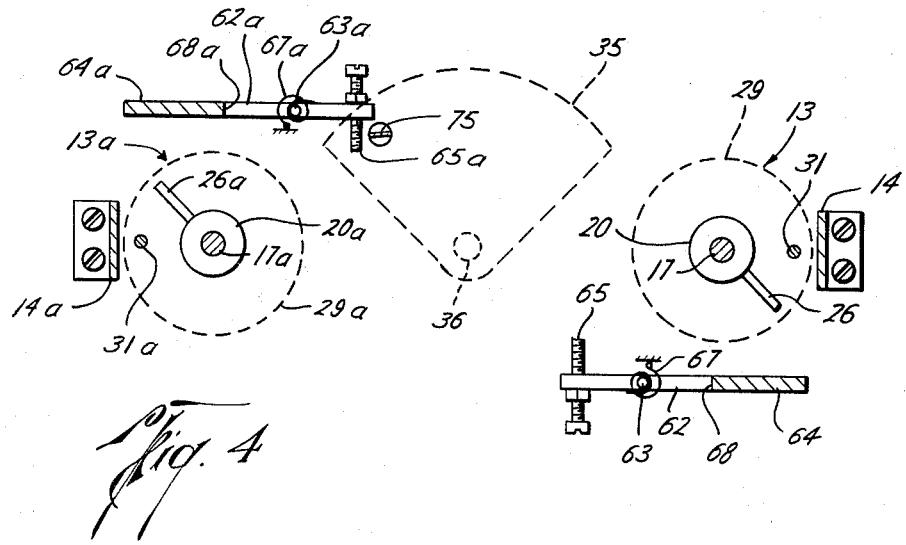
FIG. 4 is a view taken generally along line 4—4 of FIG. 2, illustrating some of the principal elements of the timing mechanisms and their relative positions at one stage of operation.
Figure 6:
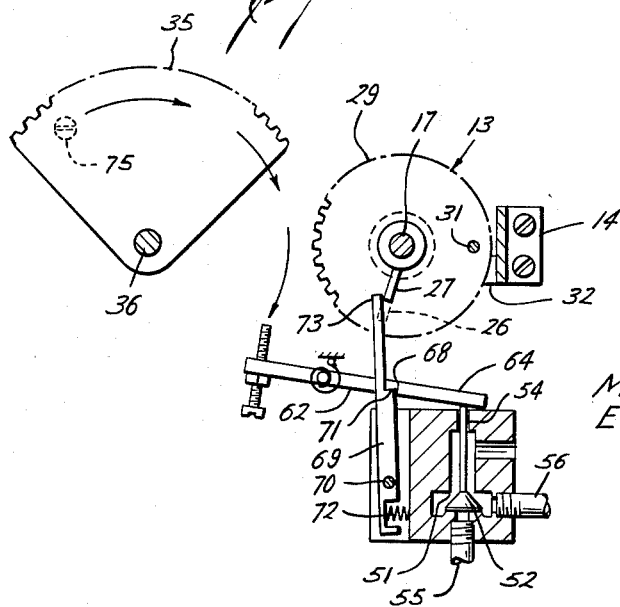

Operation of the time cycle controller will now be described. First, the angular relation of pins 26 to 27 and 26a to 27a will have been pre-set to provide the desired operating time intervals for the respective timers. It will be assumed for purposes of this description that both timers have been wound and sector gear 35 has been stopped in its neutral position, illustrated in FIG. 4. Open timer 13 has begun rotation through its operation interval and cycle timer 13a has likewise begun its movement through a new cycle. Generally speaking, the operating interval, particularly in a gas lift operation, will commonly be of the order of two or three minutes, while the cycle interval may be on an hourly basis, or longer. Thus, the operation timer will have completed its interval of operation long before completion of the cycle timer interval. FIGS. 4 and 6 illustrate the positions of the parts as operations timer 13 moves through its interval. FIG. 4 shows the latter initiating movement. FIG. 6 shows the position of the parts when pin 27 has contacted trigger extension 73, releasing arm 62 which has now swung to a position forcing valve disk 52 away from seat 51 and closing the flow of operating gas from inlet pipe 55 to outlet pipe 56, thereby shutting off the flow of operating fluid to diaphragm chamber H of controller valve V, allowing the latter to close and shut off the further injection of gas to the well from conduit C. As this occurs, cycle timer 13a will be moving through its operating interval, but since this is considerably longer than the operation interval of timer 13, nothing occurs except that engagement of pin 27 with trigger 73 will be maintained, as shown in FIG. 6, keeping the flow of operating fluid away from control valve V. When timer 13a has completed its operating interval, as seen in FIG. 7, pin 27a will strike trigger extension 73a, releasing lever 62a to push valve disk 52a to the position opening the valve to the passage of pressure fluid through inlet pipe 60 to outlet pipe 61 of pilot valve A', and thence through branch conduits 62b to jets 41 of re-wind turbine 39. The jets of gas striking vanes 40 of the turbine rotate the latter, thereby rotating sector gear 45. The latter rotates very rapidly, generally completing its rotation in about one or two seconds, and will first engage re-wind gear 29, driving it in the counterclockwise direction, moving pin 31 away from stop 32 and into contact with pin 26, causing the latter to rotate shaft extension 17 in the direction to re-wind the timer spring and return pins 26 and 27 to their starting position (FIG. 7), since they are secured in a fixed relation to each other and to shaft extension 17. As the last tooth on sector gear 35 disengages from re-wind gear 29, coil spring 33 will immediately return gear 29 to its initial position at which pin 31 is engaged with stop 32 in readiness for another re-wind operation. At the same time, as sector gear 35 clears gear 29, cam lug 75 will strike cam follower 65, pushing arm 62 in a direction to raise end 64 away from pilot valve stem end 54 and allow trigger 69 to re-engage arm 62 to hold it in the inactive position with respect to the pilot valve stem, as seen in FIG. 8. This will re-open the flow of pressure fluid to control valve V and operation timer 13, having just been re-set, will begin running off its operating interval. As sector gear 35 then continues its clockwise rotation, it engages re-wind gear 29a of timer 13a (FIG. 8) and as it travels past the latter it will drive re-wind gear 29a in a direction to carry pin 31a against pin 26a to thereby re-wind timer 13a. Again, as the sector gear clears re-wind gear 29a, the re-wind gear will be returned to its initial position against stop 32a. Also, as the sector gear clears re-wind gear 29a, cam lug 75 will engage cam follower 65a and rotate arm 62a in a direction to allow trigger 69a to re-engage with arm 62a and hold the latter out of engagement with stem end 54a of pilot valve A'. This will allow valve disk 52a to move to the closed position on seat 51a, shutting off flow of pressure fluid to turbine 39 and stopping the re-wind mechanism, sector gear 35 then being returned to the neutral position shown in FIGS. 3, 4, and 6.

Cycle timer 13a and operation timer 13, having thus been rewound and reset will both commence essentially simultaneously to run off their respective time intervals. During this time, the turbine drive of the re-wind mechanism is inactive. Operation timer 13 will run its course first terminating in the actuation of pilot A as shown in FIG. 6. This closes off the flow of pressure fluid to control valve V. Cycle timer 13a, continues to run down until finally pin 29a again strikes trigger 27a as in FIG. 7. The turbine re-wind mechanism is reactivated and immediately re-winds timers 13 and 13a as described, relocks lever 62 in the valve opening position and relocks lever 62a in the valve closing position (FIG. 3).

From the foregoing, it will be seen that the re-winding and re-setting operation of the timers is fully automatic and that the respective control intervals are infinitely variable within the maximum time limits of the respective timers, being set merely by rotating setting sleeve 20 relative to shaft extension 17 to set the related stop pins at any desired angular relation. Thus, all necessary time adjustments can be made very quickly and easily and the repeat operations required for the operating time and cycle time are made completely automatic.

While, in accordance with the illustrative embodiment, two timers are employed, one on operations timer and the other a cycle timer, it will be evident that a larger number of timers may be included in a system of the kind herein described. For example, there may be a series of operation timers designed to effect various timed operation intervals during each cycle. Such timers may be located effectively along the path of rotation of the sector gear so that the several operation timers may be re-wound and re-set in sequence during the re-winding phase of the control operation. Numerous arrangements of this kind may be employed and it is not intended that the present invention be limited to the employment of only a single operations timer in combination with a cycle timer.

While in the illustrative embodiment the timer housings are fixed and the timer shafts are arranged for rotation relative thereto for operating the various driven elements, it will be evident that the shafts may be fixed and the timer housings arranged for relative rotation. In such an alternative arrangement, it will be obvious that the driven elements of the controller will be suitably connected to the time housings and operative thereby instead of by the shafts. Thus, each timer may be described as comprising a fixed element and a relatively rotatable element. The driven elements would then be operative by the rotatable element of the timers and the restoring mechanism would then operate on these rotatable elements.

It will be understood that numerous other modifications and alterations may be made in the details of the illustrative embodiment within the scope of the appended claims, but without departing from the spirit of this invention.

What we claim and desire to secure by Letters Patent is:

1. A time cycle controller, comprising:
  (a) a pair of interval timers having spring driven reversible power shafts adapted to be rotated from initial positions through angular distances corresponding to pre-determined time intervals;
  (b) operating devices controlled by the respective timers;
  (c) means carried by the shafts arranged to actuate the respective operating devices at termination of the respective pre-determined time intervals;
  (d) a restoring mechanism arranged to successively drivingly engage said shafts to return them to their initial positions; and
  (e) means operable in response to actuation of the second-actuated of said operating devices to energize said restoring mechanism.

2. A time cycle controller according to claim 1, wherein said operating devices are pilot valves for controlling pressure fluid streams.

3. A time cycle controller according to claim 1, wherein said operating devices are pilot valves controlling pressure fluid streams, and said restoring mechanism includes turbine means powered by pressure fluid.

4. A time cycle controller, comprising:
  (a) a pair of interval timers having spring driven reversible power shafts adapted to be rotated from initial positions through angular distances corresponding to pre-determined time intervals;
  (b) operating devices controlled by the respective timers;
  (c) means carried by the shafts arranged to successively actuate the respective operating devices at termination of the respective pre-determined time intervals;
  (d) a restoring mechanism including re-wind gears mounted on said shafts, a sector gear arranged to successively drivingly engage said re-wind gears to return said shafts to their initial positions; and
  (e) means including pressure fluid powered turbine means operable in response to actuation of the second-actuated of said operating devices to energize said sector gear.

5. A time cycle controller, comprising:
  (a) a pair of interval timers having spring driven reversible power shafts adapted to be rotated from initial positions through angular distances corresponding to pre-determined time intervals;
  (b) means for varying said angular distances;
  (c) operating devices controlled by the respective timers;
  (d) said operating devices comprising pilot valves controlling pneumatic pressure fluid streams;
  (e) means for supplying pneumatic pressure fluid to said pilot valves;
  (f) means carried by the shafts arranged to successively actuate the respective pilot valves at termination of the respective pre-determined time intervals;
  (g) a restoring mechanism including re-wind gears mounted on said shafts, a sector gear arranged to successively drivingly engage said re-wind gears to return said shafts to their initial positions; and
  (h) means including pneumatic pressure fluid turbine means operable in response to actuation of the second-actuated of said pilot valves to energize said sector gear.

6. A time cycle controller, comprising:
  (a) a pair of interval timers having spring driven reversible power shafts adapted to be rotated from initial positions through angular distances corresponding to pre-determined time intervals, one of said time intervals being shorter than the other;
  (b) operating devices controlled by the respective timers;
  (c) means carried by the shafts arranged to actuate the respective operating devices at termination of the respective pre-determined time intervals;
  (d) a restoring mechanism arranged to successively drivingly engage said shafts to return them to their initial positions; and
  (e) means operable in response to actuation of the operating device actuated at termination of the longer time interval to energize said restoring mechanism.

7. A time cycle controller, comprising:
  (a) a plurality of interval timers having spring driven reversible power shafts adapted to be rotated from initial positions through angular distances corresponding to pre-determined time intervals;
  (b) operating devices controlled by the respective timers:
  (c) means carried by the shafts arranged to actuate the respective operating devices at termination of the respective pre-determined time intervals;

(d) a restoring mechanism arranged to successively drivingly engage said shafts to return them to their initial positions; and (e) means operable in response to actuation of the last-actuated of said operating devices to energize said restoring mechanism.

8. A time cycle controller, comprising:

(a) a pair of interval timers including fixed elements and spring driven reversibly rotatable elements adapted to be rotated from initial positions through angular distances corresponding to pre-determined time intervals;

(b) operating devices controlled by the respective timers;

(c) means carried by the rotatable elements arranged to actuate the respective operating devices at termination of the respective pre-determined time intervals;

(d) a restoring mechanism arranged to successively drivingly engage said rotatable elements to return them to their initial positions; and (e) means operable in response to actuation of the second-actuated of said operating devices to energize said restoring mechanism.

9. A time cycle controller according to claim 8 wherein said operating devices are pilot valves for controlling fluid pressure streams.

10. A time cycle controller according to claim 8 wherein said restoring mechanism includes turbine means powered by pressure fluid.

References Cited by the Examiner

UNITED STATES PATENTS

| 2,638,110 | 5/53 | Parks | 137—624.15 XR |
| 2,764,017 | 9/56 | Ronnebeck | 137—624.13 XR |
| 2,780,911 | 2/57 | McGay | 137—624.14 XR |
| 3,105,518 | 10/63 | Kunz | 137—624.14 |

WILLIAM F. O'DEA, *Primary Examiner.*

ISADOR WEIL, *Examiner.*